(12) United States Patent
Jamshidi

(10) Patent No.: US 7,647,056 B2
(45) Date of Patent: Jan. 12, 2010

(54) SYSTEM AND METHOD FOR BROKERING MOBILE SERVICE PROVIDERS

(76) Inventor: Shahryar Jamshidi, 34220 Aspen Loop, Union City, CA (US) 94587

( * ) Notice: Subject to any disclaimer, the term of this patent is extended or adjusted under 35 U.S.C. 154(b) by 327 days.

(21) Appl. No.: 11/347,751

(22) Filed: Feb. 3, 2006

(65) Prior Publication Data

US 2007/0184844 A1    Aug. 9, 2007

(51) Int. Cl.
*H04Q 7/23*    (2006.01)
(52) U.S. Cl. .............. 455/456.3; 455/456.2; 455/406; 709/201; 701/214
(58) Field of Classification Search .............. 455/456.3, 455/456.2, 418, 406; 709/201; 701/214; 715/747
See application file for complete search history.

(56) References Cited

U.S. PATENT DOCUMENTS

| | | | |
|---|---|---|---|
| 6,526,275 B1 * | 2/2003 | Calvert | ........................ 455/418 |
| 6,961,562 B2 | 11/2005 | Ross | |
| 2003/0065805 A1 * | 4/2003 | Barnes, Jr. | ................... 709/231 |
| 2003/0220835 A1 * | 11/2003 | Barnes, Jr. | ..................... 705/14 |
| 2004/0161079 A1 * | 8/2004 | Virzi et al. | ................ 379/88.02 |
| 2005/0130585 A1 * | 6/2005 | Gnuschke et al. | ........... 455/3.06 |
| 2005/0136949 A1 * | 6/2005 | Barnes, Jr. | ................... 455/461 |
| 2005/0216337 A1 | 9/2005 | Roberts | |
| 2005/0228719 A1 | 10/2005 | Roberts | |
| 2006/0053378 A1 * | 3/2006 | Fano et al. | ................... 715/747 |

* cited by examiner

*Primary Examiner*—Danh C Le
(74) *Attorney, Agent, or Firm*—Foothill Law Group, LLP; Howard E. Lebowitz; Barton A. Smith

(57) ABSTRACT

The present invention comprises a method and system for dispatching a plurality of mobile service providers among a plurality of users (stationary) based on proximity of a user to a particular mobile service provider. One or more representations of proximity will be presented to a user on a map (radar screen) by the system and the system computes offers based on proximity.

13 Claims, 9 Drawing Sheets

SYSTEM AND METHOD FOR BROKERING MOBILE SERVICE PROVIDERS

BACKGROUND

1. Field of the Invention

The present invention relates to systems and methods for brokering the services of a plurality of mobile service providers among a plurality of users based on the physical proximity of service providers to users. The methods comprise presenting proximity data of the service providers to the user on at least one map. The methods further comprise offering services at a price based on the proximity and how soon the service is provided.

2. Description of the Related Art

U.S. Pat. No. 6,961,562 relates to location related services associated with mobile communications devices and, to a method and apparatus for acquiring, processing, using and brokering location related information associated with mobile communication devices operating on a wireless telecommunications network.

US 20050228719 pertains to electronic distribution of product or service promotion information to a mobile user are disclosed. A user may provide profile information to an online promotion service, such as user interests and preferences with respect to products and services as well as other information. The online promotion service may receive location information of point-of-sale facilities associated with particular promotions for products or services. The online promotion service may generate one or more targeted promotions to a mobile user when the user travels within a predetermined distance of an associated point-of-sale facility. A mobile user's location may be identified by a global positioning system and conveyed to the online promotion service. The user location information may be transmitted via a cell phone, a PDA, a pager or other device. This enables the user to take advantage of targeted or requested promotions while the user is within a close proximity to an associated point-of-sale facility.

US20050216337 pertains to electronic distribution of incentives having real-time consumer-based directions according to another embodiment of the present invention are disclosed. An online promotion service may receive user profile information, which may include demographic information, location information, user preferences, user requests, and other information. Online promotion service may provide targeted incentives and promotions to a particular user or class of users based on user profile information and other information. Incentives may include coupons, promotions, rebates, sales notifications, free samples, and other product or service related incentives. The patents mentioned above are hereby incorporated herein by reference.

SUMMARY OF THE INVENTION

The present invention comprises a method and system for dispatching a plurality of mobile service providers among a plurality of users (stationary) based on proximity of the user to a particular mobile service provider. Proximity may refer to the physical distance between the user and each mobile service provider or possibly to a more sophisticated proximity such a driving time over streets and highways, or a still more sophisticated method such a driving time taking into account current traffic conditions. One or more representations of proximity will be presented to a user on a map (radar screen), with different measures indicated by color coding or other indicia. A pricing structure will be presented based on some measure of proximity, for instance, in one preferred embodiment a lower rate for a more proximal customer is applied and same-day/next-in-line service is guaranteed. A profile of the service providers will be made available showing their capabilities, price, and business terms. A user chooses a service provider, enters his account information, enters a brief description of the service be needs, and makes a reservation. Service providers pick up the reservations and update the system server and estimates how long he will be occupied with the service call (at each service location). He updates the system server when he completes the work for a user. When the user accepts completion of the work, his account is charged for the service provider's fee. The method also allows for registration of MSP from the coverage area and verification of MSP credentials. The method also allows for pairing of journeymen with appropriate master craftsmen for sponsorship. A user may also choose to make a reservation for a future date. In this case, the system must track the estimated location of Mobile Service Providers on the future dates and offer proximity discounts based on the future date's schedule.

A system for carrying out the method comprises a system server programmed to track the position of a plurality of Mobile Service Providers (MSP) on the current and optionally future dates and display their position (proximity) to each of the users along with a profile of each MSP. The information is provided to users over an electronic network such as the public Internet. The MSP's will have a means of contacting the system server, such as a mobile computing device, or verbally over the telephone. The system also allows for automatic registration of MSPs from all over the coverage area with appropriate verification of the MSP's credentials with respect to the various licenses and master craftsman sponsorship (done over the Internet).

It is an object of the invention to provide a method and system for dispatching a plurality of Mobile Service Providers among a plurality of stationary users by displaying the proximity of Mobile Service providers to user.

It is a further object of the invention to offer a user pricing options for MSPs based on the proximity of the MSP to the user.

It is a still further object of the invention to offer automatic registration of MSPs and verification of MSP credentials.

It is a still further object of the invention to pair up journeymen with appropriate master craftsmen.

It is a still further object of the invention to make the system available over a public electronic network such as the public internet.

These and other objects of the invention will be apparent from a detailed description and accompanying drawings which are provided by way of example and not limitation.

DETAILED DESCRIPTION OF THE PREFERRED EMBODIMENTS

The invention is now described more fully with reference to the accompanying drawings in which several preferred embodiments are shown. The invention may be embodied in many different forms and should not be construed to be limited to the preferred embodiments illustrated, but rather these embodiments are provided to fully convey the scope of the invention to those skilled in the art, and should be construed to be limited only by the scope of the appended claims.

Figure 1:
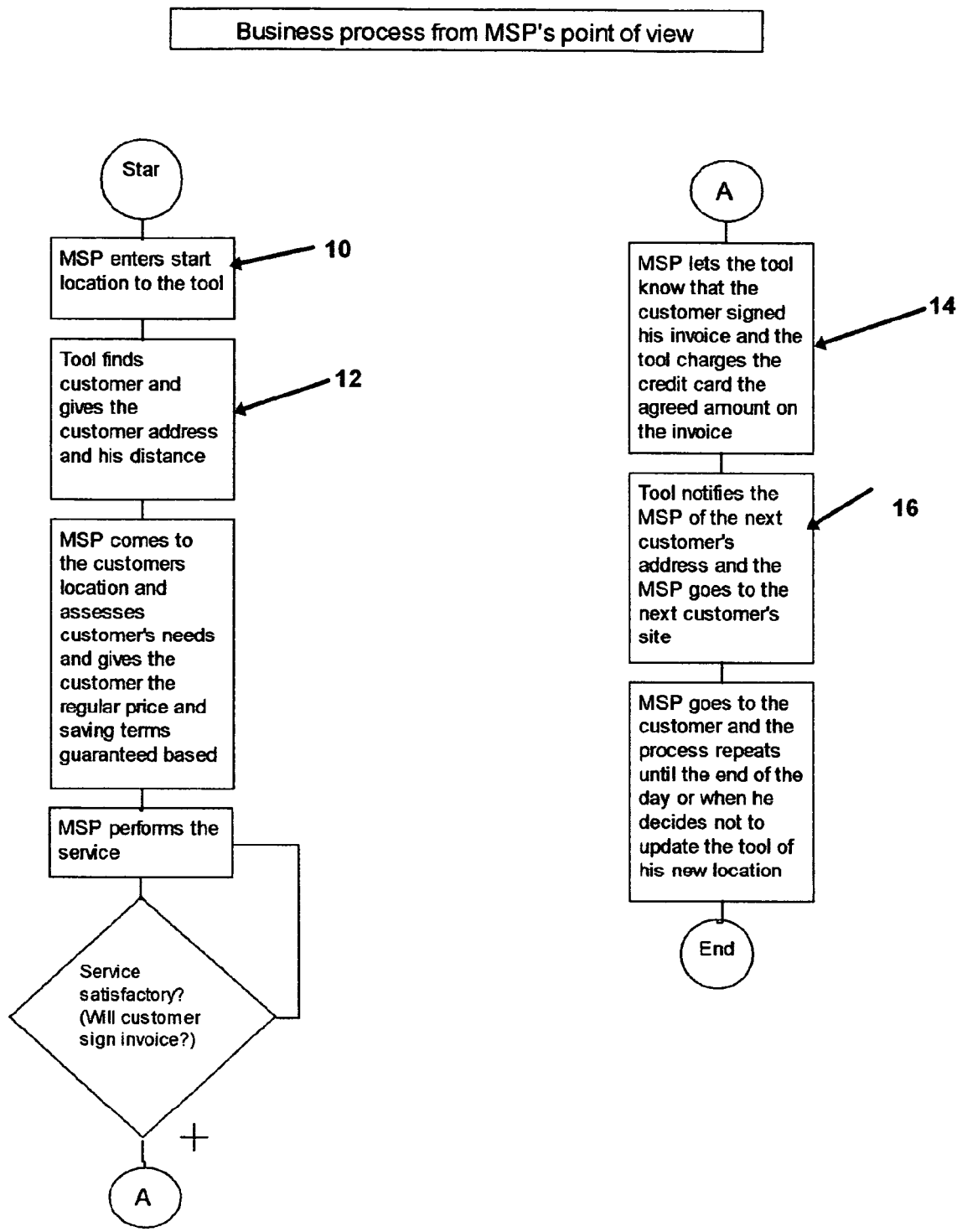
FIG. 1 is a flow diagram of the overall business process from the MSP's point of view.

FIG. 1 shows the process from the point of view of the MSP. An MSP contacts the system and may:
1) Pick up the name and address of the current customer 12,
2) Report to system if a provided service has been accepted (invoice signed) 14,
3) Report the current location of the MSP 10, or
4) Pick up the name and address of the next customer 16.

Figure 2:
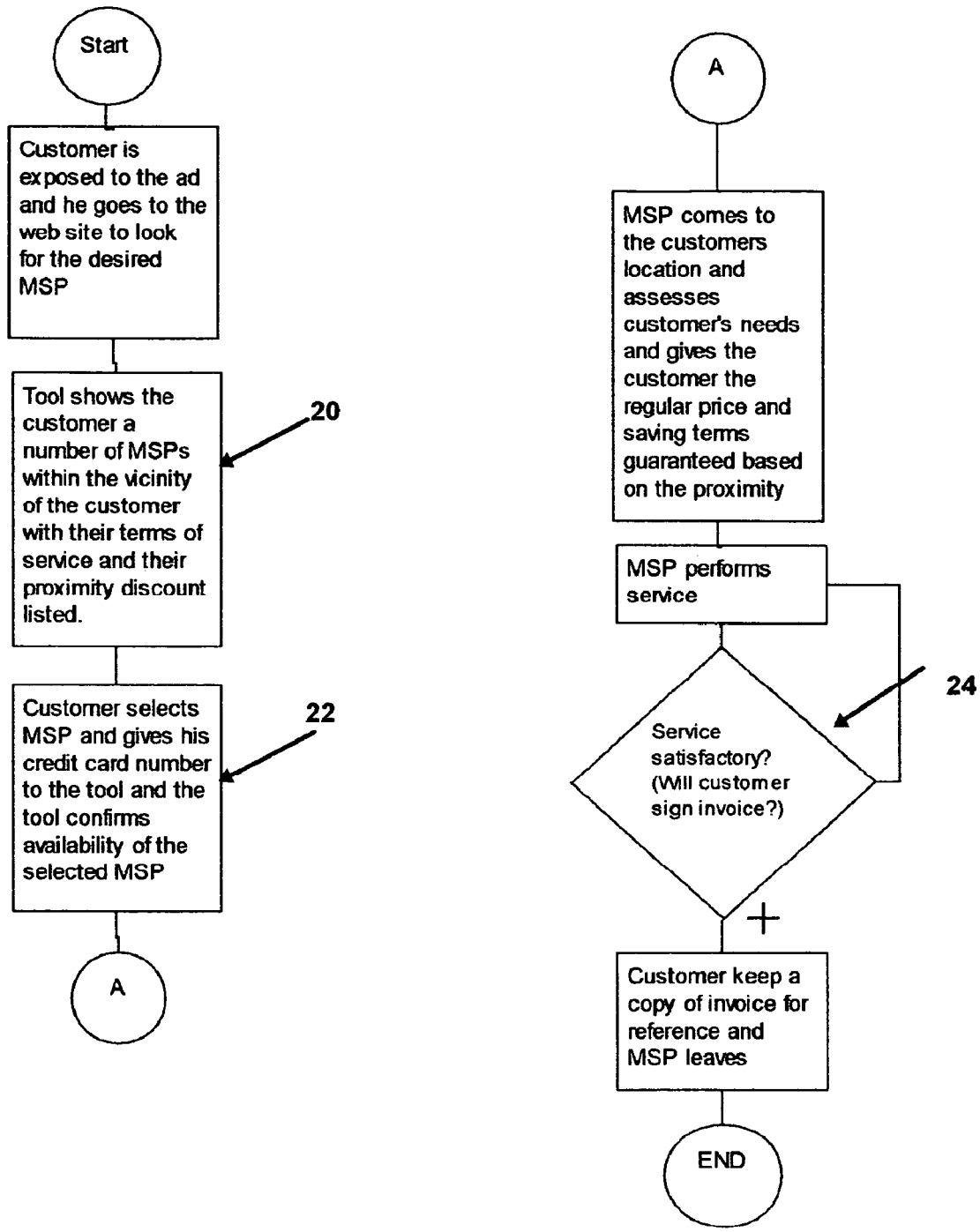
FIG. 2 is a flow diagram of the overall business process from the stationary user's point of view.

FIG. 2 shows the process from the point of view of a stationary user (customer). He may contact the system web page and be presented a map showing the proximity of MSP's in his vicinity. His options are to choose an MSP based on terms and proximity 20,22 or to approve the invoice when the work is complete 24.

Figure 3:
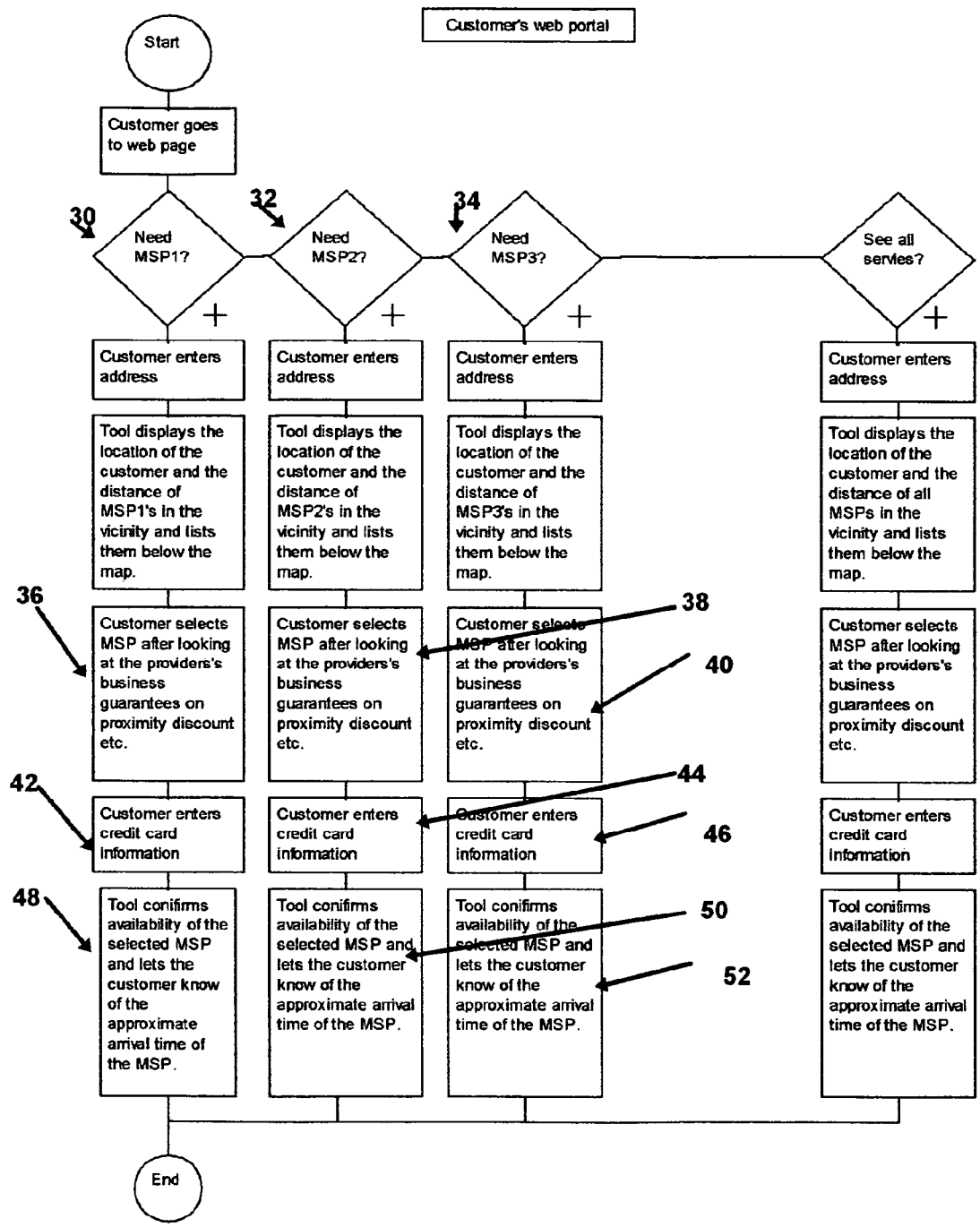
FIG. 3 is a flow diagram of the logic of the stationary user's web portal showing selection and enrollment.

FIG. 3 shows the logic of the web portal presented to a stationary user (customer). He is presented with a choice of MSP's in his vicinity 30, 32, 34 and selects one or more to provide service 36, 38, 40. He enters his account number 42, 44, 46 and receives verification that the chosen MSP is actually available 48,50,52.

Figure 4:
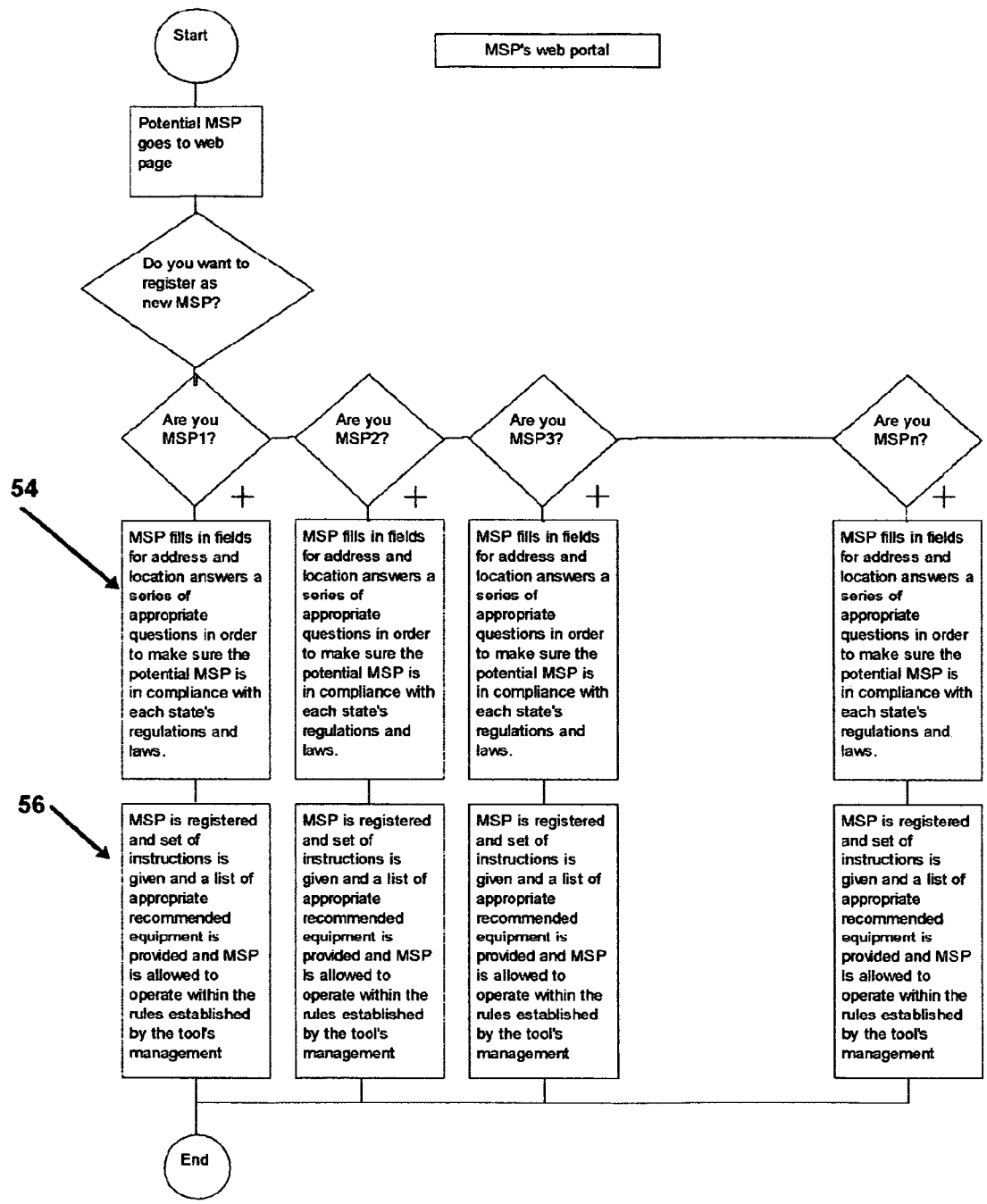
FIG. 4 is a flow diagram of the logic of the MSP enrollment portal.

FIG. 4 shows the MSP enrollment portal. This portal obtains information about an MSP 54, 56 and registers him to receive orders from customers.

Figure 5:
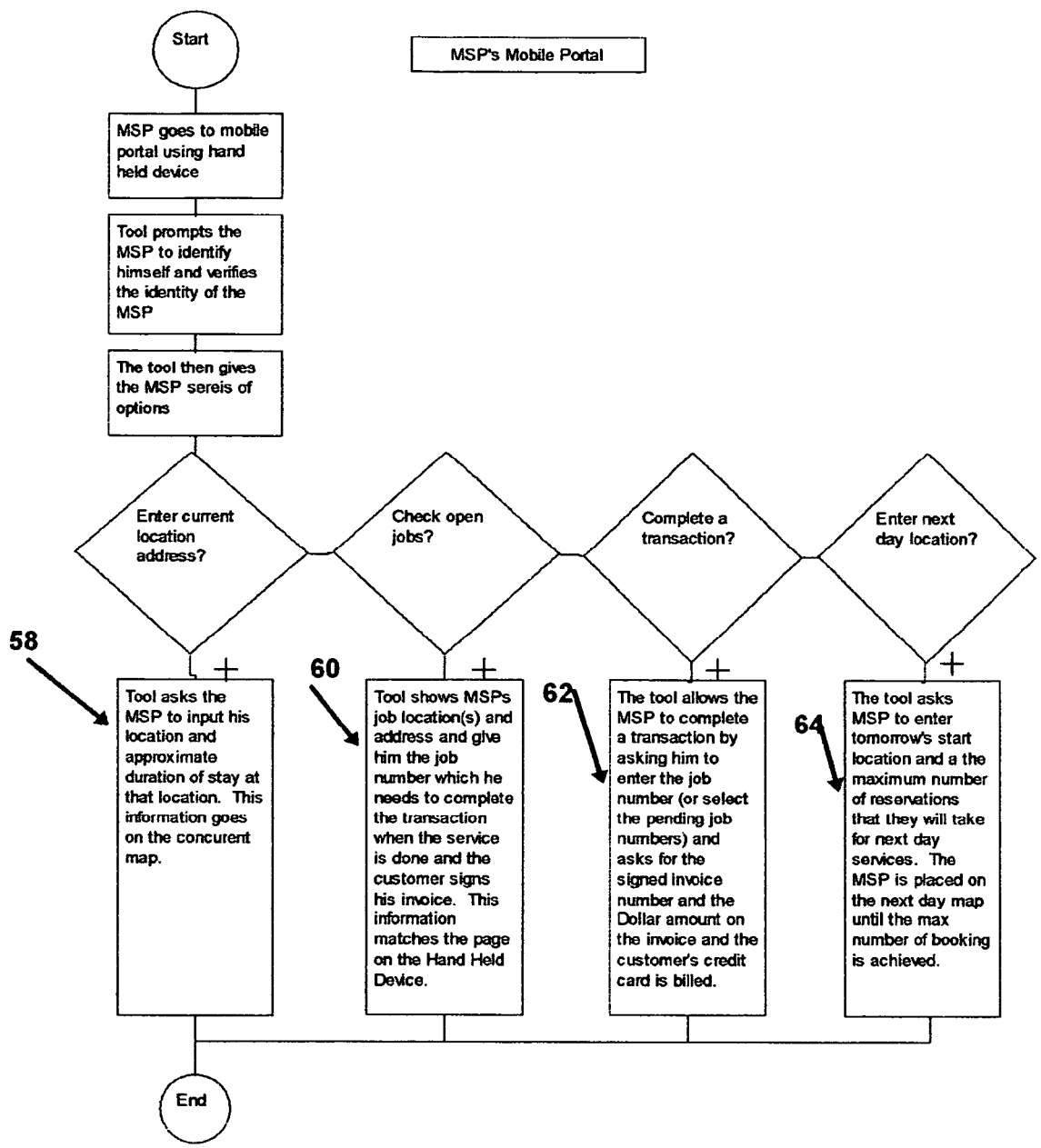
FIG. 5 is a flow diagram of the MSP mobile web portal.

FIG. 5 shows the MSP mobile portal. This portal allows an MSP to
1) Update his location to the system 58,
2) Pick up his next assignment 60,
3) Complete a transaction (charge a customer's account) 62, or
4) Input location information for future dates 64.

Figure 6:
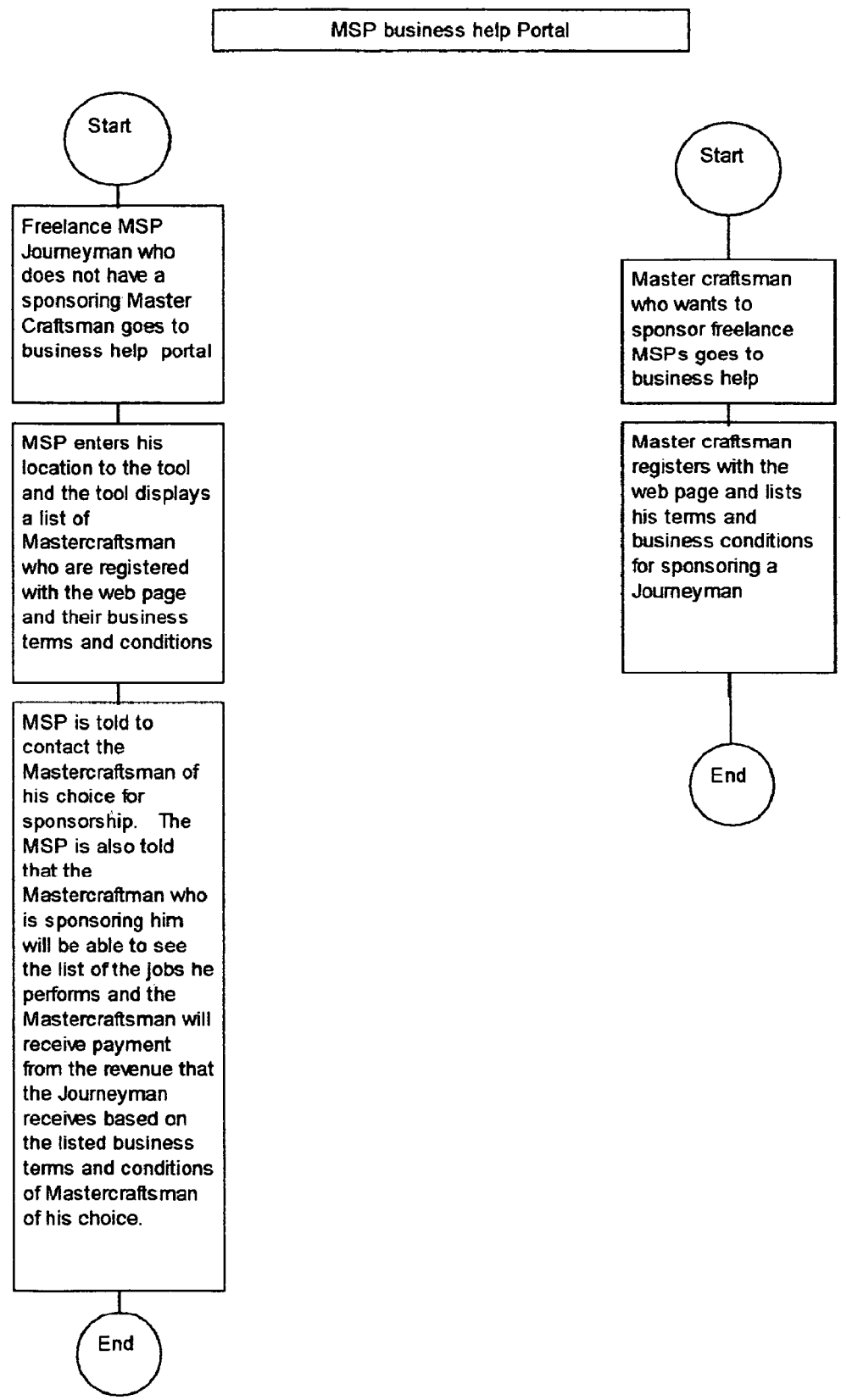
FIG. 6 is a flow diagram of the business help diagram for pairing master craftsmen and independent journeyman craftsmen.

FIG. 6 illustrate the business help portal where master craftsmen and journeymen are paired up.

Figure 7:
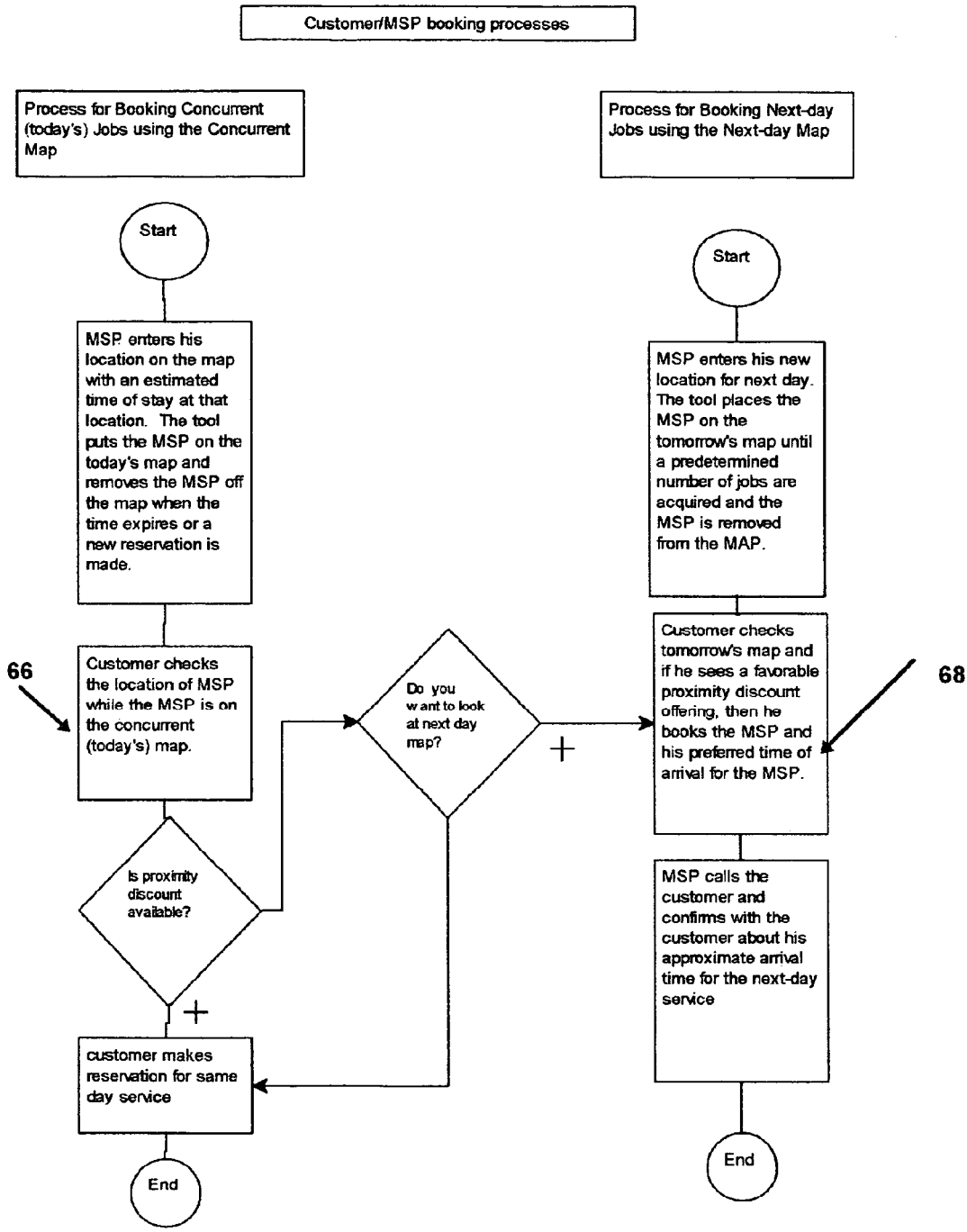
FIG. 7 is a flow diagram of the booking process.

FIG. 7 shows the customer/MSP booking process. After a customer chooses an MSP he decides whether he wants same day 66 or a future day 68.

Figure 8:
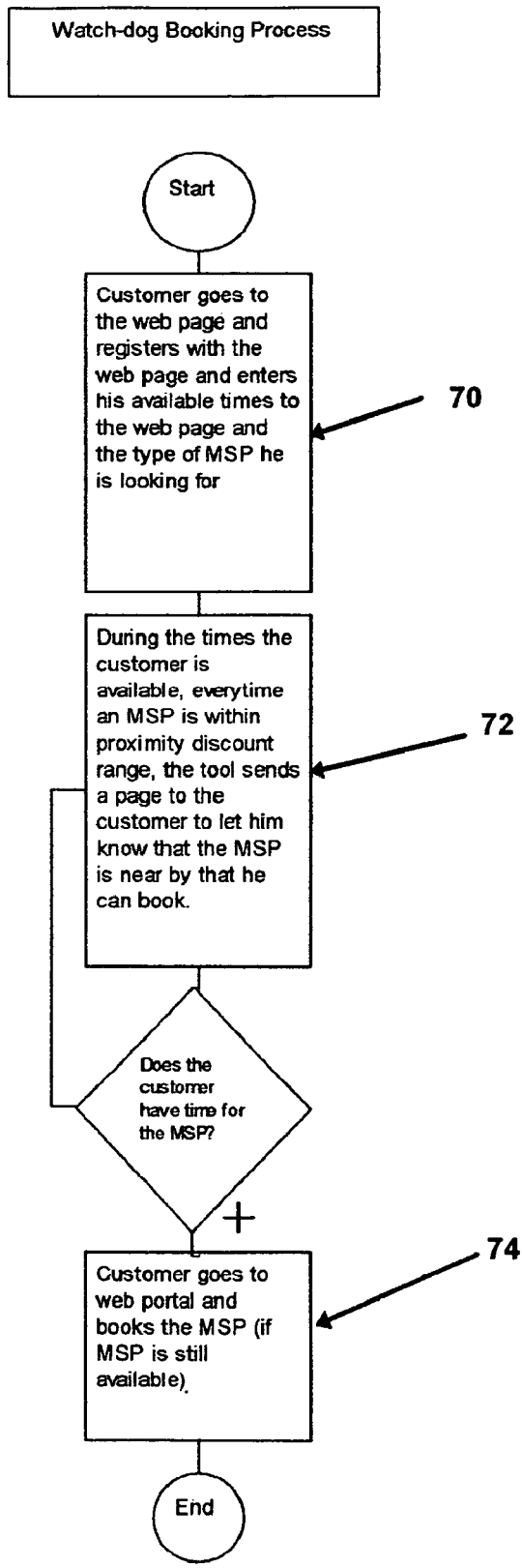
FIG. 8 is a flow diagram of the watch dog booking option.

FIG. 8 shows a watch dog booking option. In this option, the system accepts criteria from a stationary user (customer) 70, such as hourly cost and proximity, and selects the MSP's which most closely meet the criteria set by the customer. Only the selected MSP's are displayed to the customer. The customer chooses one of the displayed MSP's 72, and the process proceeds as before 74.

Figure 9:
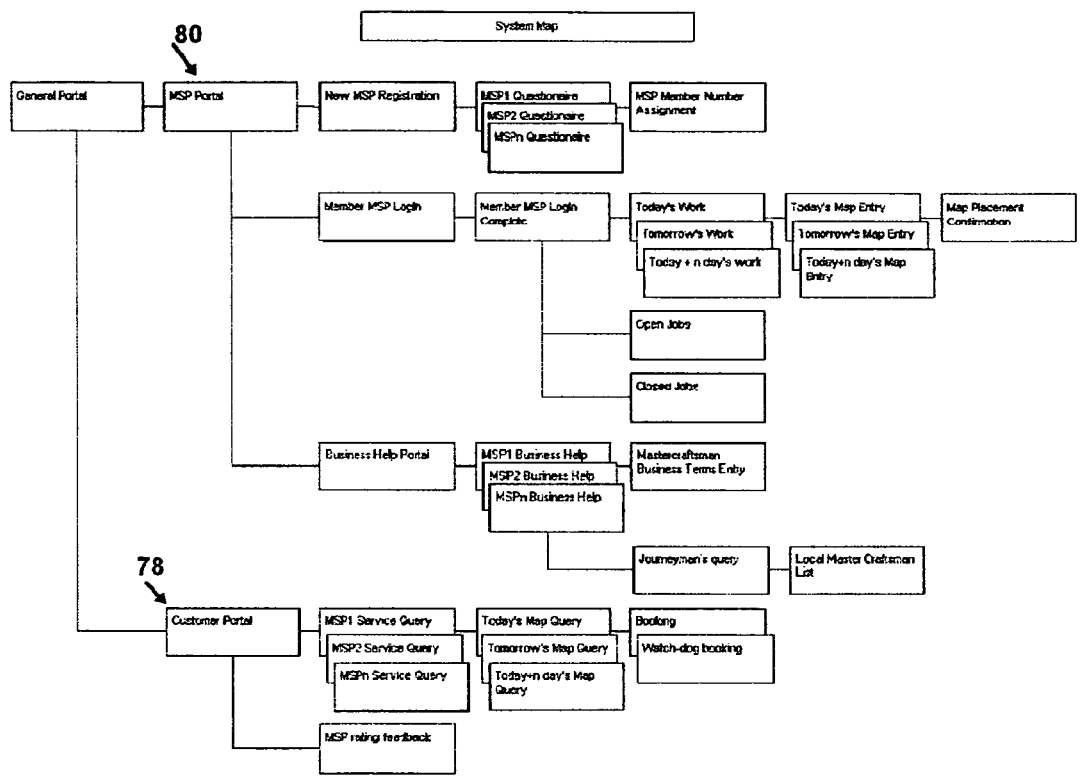
FIG. 9 is a diagram showing the relationship of the system web portals.

FIG. 9 shows an overview of the system portals. A stationary customer accesses the customer portal 78 where he observes the offering and proximity of MSP's. He receives bids which depend on standard terms for an MSP and the proximity. The system tracks the position of the MSP and the stationary customer and computes the measure of proximity and the individual bids. A customer may book the services of a chosen MSP for the current day or a future day as desired. MSP's accesses the system though the MSP Portal 80 through which they can register with the system, report their position, and pick up new jobs or report the acceptance of a job by a stationary customer.

The key aspects of the system are as follows:
1) A web portal for enrolling MSP's in the system,
2) A web portal for allowing a stationary user (customer) to enroll in the system and choose among MSP's in his vicinity,
3) Logic and resources for tracking the locations of the MSP's, computing their proximity to stationary customers and preparing a bid which depends on the proximity of an MSP and a stationary customer,
4) A business help portal for pairing master craftsmen and journeyman craftsmen,
5) A MSP mobile portal for updating the position of an MSP to the system, picking up a new order, or reporting completion of a job,
6) A customer booking process, wherein a customer can choose an MSP by proximity and can choose between same day and future day service.
7) A customer booking process, wherein a customer sets criteria for sorting the MSP's and only the MSP's which meet the criteria are displayed to the customer.
8) A customer booking process, wherein a customer enters a description of the service he needs.

The system is a server based system which preferably employs a Geographic Information System, GIS. A preferred GIS is the one provided by ESRI (Environmental Systems Research Institute, Inc.).

I claim:
1. A method of dispatching a plurality of Mobile Service Providers among a plurality of stationary users, comprising:
   a) operating a system to interact with the Mobile Service Providers and stationary users,
   b) enrolling a plurality of Mobile Service Providers in the system,
   c) enrolling a plurality of stationary users in the system,
   d) tracking the position of at least some Mobile Service Providers,
   e) computing a measure of proximity of a stationary customer to the at least some Mobile Service Providers,
   f) offering the measure of proximity of the at least some of the Mobile Service Providers to the stationary user over a public network, and
   g) offering services to the stationary user at a price related to the measure of proximity of the user and the at least some Mobile Service Provider.

2. The method of claim 1, wherein tracking the position of at least some of the Mobile Service Providers comprises tracking the position on the current date and at least one future date.

3. The method of claim 2, wherein offering the position of at least some of the Mobile Service Providers comprises presenting the at least some of the stationary users with an electronic map which shows the relative proximity of a user to the Mobile Service Providers.

4. The method of claim 3, wherein the map is presented on the world wide web.

5. The method of claim 2, wherein relative proximity, comprises ground distance.

6. The method of claim 2, wherein relative proximity comprises estimated travel time.

7. The method of claim 2, wherein relative proximity comprises estimated travel time taking into account local traffic condition.

8. The method of claim 2, wherein offering services to at least some stationary users comprises offering a lower price for services to be provided by more proximal Mobile Service Providers.

9. The method of claim 2, wherein the system comprises the public Internet.

10. The method of claim 2, wherein enrolling Mobile Service Providers comprises, pairing independent journeyman with sponsorship by appropriate master craftsman.

11. The method of claim 2, wherein enrolling Mobile Service Providers further comprises verifying credentials of the Mobile Service Provider.

12. The method of claim 2, further comprising accepting criteria from a stationary user and presenting the user only with those MSP's which meet the user's criteria.

13. A system for dispatching a plurality of Mobile Service Providers among a plurality of stationary users, comprising: a system server operating on a public network, with logic and resources to enroll a plurality of Mobile Service providers, to enroll a plurality of stationary users, to track the position of at least some of the Mobile Service Providers, to provide information to at least some of the stationary users comprising the proximity of Mobile Service Providers, and to offer services to the at least some stationary users based on their proximity to a Mobile Service Provider, wherein the logic and resources further comprise logic and resources to accept a reservation from a stationary user, assign the reservation to a Mobile Service Provider and charge the user's account when the service has been provided, and wherein the logic and resources to offer services to at least some stationary users comprises logic and resources to offer a lower price for services to be provided by a more proximal Mobile Service Provider.

* * * * *